(12) United States Patent
Nakatsugawa

(10) Patent No.: US 6,272,135 B1
(45) Date of Patent: Aug. 7, 2001

(54) DATA COMMUNICATION METHOD AND SYSTEM FOR ONE-TO-ONE COMMUNICATION AND ONE-TO-PLURALITY BROADCAST COMMUNICATION

(75) Inventor: Yoshinori Nakatsugawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/031,553

(22) Filed: Feb. 27, 1998

(30) Foreign Application Priority Data

Feb. 28, 1997 (JP) .................................................. 9-046379

(51) Int. Cl.[7] ............................. H04L 12/28; H04L 12/54
(52) U.S. Cl. .......................... 370/390; 370/432; 370/475
(58) Field of Search .................................. 370/349, 396, 370/397, 400, 401, 402, 411, 432, 452, 475, 390

(56) References Cited

FOREIGN PATENT DOCUMENTS

| 55-121762 | 9/1980 | (JP) . |
| 63-193634 | 8/1988 | (JP) . |
| 1-160234 | 6/1989 | (JP) . |
| 6-048817 | 6/1994 | (JP) . |

*Primary Examiner*—Wellington Chin
*Assistant Examiner*—Brenda H. Pham
(74) *Attorney, Agent, or Firm*—Oblon, Spivak, McClelland, Maier & Neustadt, P.C.

(57) ABSTRACT

An addressing area is provided to a data area of communication data serving as a transmission object, then root addresses which are constructed by aligning addresses of the relay units existing at branch points in communication routes in passing order are written previously into the addressing area if one-to-one communication between node terminals is to be executed, otherwise broadcast group addresses of node terminal groups as broadcast destinations are written previously in place of the root addresses into the addressing area if one-to-plural broadcast communication between node terminals is to be executed.

5 Claims, 6 Drawing Sheets

FIG. 6

DATA FORMAT WHEN DATA ARE BROADCASTED FROM N1 TO ALL NODES

| AL | N | N | MT | ML | DATA | CRC | ACK |
|----|---|---|----|----|------|-----|-----|
|    | 1 | X |    |    |      |     |     |

N : CLASSIFICATION=NODE

NN=X : ALL NODES ARE DESIGNATED

NN=Y : NODES BELONGING TO THE FIRST GROUP ARE DESIGNATED

NN=Z : NODES BELONGING TO THE SECOND GROUP ARE DESIGNATED

DATA COMMUNICATION METHOD AND SYSTEM FOR ONE-TO-ONE COMMUNICATION AND ONE-TO-PLURALITY BROADCAST COMMUNICATION

BACKGROUND OF THE INVENTION

1. Field of the Invention

The present invention relates to a data communication method used for executing data exchange between different networks by connecting a plurality of networks via relay units including gate ways, root hubs, or hubs mutually, and a data communication system using this communication method. More particularly, the present invention relates to a data communication method capable of surely transmitting communication data to a designated node terminal as a destination without a reduction in data transmission capacity per unit time, even when data exchange is executed between the different networks with the intervention of one or more than two networks in communication routes and also data communication routes branch out into plural routes with the travel of communication data, and a data communication system using this communication method.

2. Description of the Prior Art

In the prior art, as disclosed in Patent Application Publication (KOKAI) 59-62245, for example, a data communication system has been widely known in which a plurality of local area networks (referred to as "LAN's" hereinafter) used to execute data exchange between a plurality of stations are connected via gate ways to enable data exchange between LANs.

According to the technology disclosed in the above Publication, in addition to a transmitter/receiver address for designating the transmitter and the receiver of data respectively, both a transmitting or receiving station address indicating the data transmitting or receiving station and a network address indicating the network to which the data transmitting or receiving station belongs have been provided in the transmitter/receiver address of the communication data. Hence, even if data communication is to be carried out beyond its own network, certain data communication between different LAN's has been made possible by referring to these addresses upon data communication.

However, according to the addressing approach used in the above data communication system in the prior art, the network address designated as the destination and the network address peculiar to the LAN in which the communication data reside are compared with each other and then it is determined timely whether or not the communication data reach the destination LAN based on the result that these addresses coincide with each other or not. For this reason, at the time when the data communication is enabled between LAN's with the intervention of one or more than two LAN's in the communication routes, for example, if data communication routes branch out into plural routes with the travel of communication data, it has not been able to be decided which branch route the communication data is to be supplied to, so that the communication data have reached the destination LAN while making a detour on the route. As a result, in the above data communication system in the prior art, such a problem to be overcome has resided that it is difficult to increase data transmission capacity per unit time.

Moreover, according to the addressing approach in the above data communication system in the prior art, such another problem to be overcome has arisen that it is difficult to satisfy the request that the communication data should be broadcasted from one source to plural destinations.

SUMMARY OF THE INVENTION

The present invention has been made in light of the above circumstances, and it is an object of the present invention to provide a data communication method which is able to transmit communication data surely to a designated one or more than two node terminals as destinations without a reduction in data transmission capacity per unit time, even when data exchange is executed between a plurality of networks with the intervention of one or more than two networks in communication routes and also data communication routes branch out into plural routes with the travel of communication data, by providing an addressing area in a data area of the communication data serving as a transmission object and then, if one-to-one communication is carried out between the node terminals, writing previously in this addressing area root addresses which are constructed by arranging their own addresses of relay units positioned at branch points in the communication routes in their passing order or, if one-to-plural broadcast communication is carried out between the node terminals, writing previously broadcast group addresses of node terminal groups as broadcast destinations in place of the root addresses in this addressing area, and a data communication system using this communication method.

In order to achieve the above object of the present invention, according to an aspect of the present invention, there is provided a data communication method used to execute data exchange between a plurality of networks which are connected via relay units mutually and to which node terminals are connected respectively, comprising the steps of: writing previously root addresses, which are constructed by aligning in passing order addresses of the relay units existing at branch points in communication routes, into an addressing area of a data area of communication data serving as a transmission object if one-to-one communication between node terminals is to be executed; otherwise, writing previously broadcast group addresses of node terminal groups as broadcast destinations in place of the root addresses into the addressing area of the data area of communication data serving as the transmission object if one-to-plural broadcast communication between node terminals is to be executed; decoding the root addresses or the broadcast group addresses included in the communication data transmitted from the node terminals by the relay units; deciding that the communication data are transmitted via either one-to-one communication between node terminals or one-to-plural broadcast communication between node terminals, by the relay units based on the decoded root addresses or the decoded broadcast group addresses; when, as a result of the above deciding step, it is decided that one-to-one communication between node terminals is executed, comparing/deciding by the relay units whether or not previously stored addresses of the relay units are included in the decoded root addresses, then selecting appropriate routes as a destination of the communication data by the relay units based on a result of comparison/decision, and then transmitting the communication data to node terminals designated as the destination via the selected routes; and when, as the result of the above deciding step, it is decided that one-to-plural broadcast communication between the node terminals is executed, selecting appropriate routes as the destination of the communication data by the relay units based on the decoded broadcast group addresses and addresses peculiar to the node terminals belonging to node terminal groups corresponding to the broadcast group addresses stored previously, and then broadcasting the communication data to a plurality of node terminals designated as the broadcast destinations via the selected routes by the relay units.

According to the present invention, the relay units can decode the root addresses or the broadcast group addresses included in the communication data transmitted from the node terminals, and then decide that the communication data are transmitted via either one-to-one communication between node terminals or one-to-plural broadcast communication between node terminals based on the decoded root addresses or the decoded broadcast group addresses. When it is decided as a result of the above decision that one-to-one communication between node terminals is executed, the relay units can compare/decide whether or not previously stored own address is included in the decoded root addresses, then select appropriate routes as a destination of the communication data based on a result of comparison/ decision, and then transmit the communication data to node terminals designated as the destination via the selected routes. Otherwise, when it is decided as the result of the above decision that one-to-plural broadcast communication between the node terminals is executed, the relay units can select appropriate routes as the destination of the communication data based on the decoded broadcast group addresses and addresses peculiar to the node terminals belonging to node terminal groups corresponding to the broadcast group addresses stored previously, and then broadcast the communication data to a plurality of node terminals designated as the broadcast destinations via the selected routes. Therefore, since the root addresses are employed in the case of one-to-one communication between node terminals, otherwise the broadcast group addresses in place of the root addresses are employed in the case of one-to-plural broadcast communication between the node terminals, even if data exchange is executed between a plurality of networks with the intervention of one or more than two networks in communication routes and also data communication routes branch out into plural routes with the travel of communication data, communication data can be transmitted surely to one or more than two designated node terminals as the destinations without a reduction in data transmission capacity per unit time.

In the preferred embodiment of the present invention, the relay units includes the relay units to which the node terminals are connected and the relay units to which the node terminals are not connected.

In order to achieve the above object of the present invention, according to another aspect of the present invention, there is provided a data communication method used to execute data exchange between a plurality of networks which are connected via relay units mutually and to which node terminals are connected respectively, comprising the steps of: writing previously root addresses, which are constructed by aligning in passing order addresses of the relay units existing at branch points in communication routes, into an addressing area of a data area of communication data serving as a transmission object if one-to-one communication between node terminals is to be executed; otherwise, writing previously broadcast group addresses of node terminal groups as broadcast destinations in place of the root addresses into the addressing area of the data area of communication data serving as the transmission object if one-to-plural broadcast communication between node terminals is to be executed; decoding the root addresses or the broadcast group addresses included in the communication data transmitted from other node terminals connected to other relay units except own node terminal, by the relay units to which the node terminals are connected; deciding that the communication data are transmitted via either one-to-one communication between node terminals or one-to-plural broadcast communication between node terminals, by the relay units to which the node terminals are connected, based on the decoded root addresses or the decoded broadcast group addresses; when, as a result of the above deciding step, it is decided that one-to-plural broadcast communication between node terminals is executed, deciding whether or not the node terminal connected to own network as a destination of the communication data is designated, by the relay units to which the node terminals are connected, based on the decoded broadcast group addresses and addresses peculiar to the node terminals belonging to node terminal groups corresponding to the broadcast group addresses stored previously; and when, as the result of the above deciding step, it is decided that the node terminal connected to own network as the destination of the communication data is designated, selecting both routes for the node terminals connected to own network and routes for the relay units connected to own network, by the relay units to which the node terminals are connected, based on the decoded broadcast group addresses, and then broadcasting the communication data to a plurality of node terminals designated as the broadcast destinations via the selected routes respectively by the relay units to which the node terminals are connected.

According to the present invention, the relay units to which the node terminals are connected can decode the root addresses or the broadcast group addresses included in the communication data transmitted from other node terminals connected to other relay units except own node terminal, then decide that the communication data are transmitted via either one-to-one communication between node terminals or one-to-plural broadcast communication between node terminals based on the decoded root addresses or the decoded broadcast group addresses, then decide whether or not the node terminal connected to own network as a destination of the communication data is designated based on the decoded broadcast group addresses and addresses peculiar to the node terminals belonging to node terminal groups corresponding to the broadcast group addresses stored previously, when it is decided as a result of the above decision that one-to-plural broadcast communication between node terminals is executed, then select both routes for the node terminals connected to own network and routes for the relay units connected to own network based on the decoded broadcast group addresses when it is decided as the result of the above decision that the node terminal connected to own network as the destination of the communication data is designated, and then broadcast the communication data to a plurality of node terminals designated as the broadcast destinations via the selected routes respectively.

In order to achieve the above object of the present invention, according to still another aspect of the present invention, there is provided a data communication method used to execute data exchange between a plurality of networks which are connected via relay units mutually and to which node terminals are connected respectively, comprising the steps of: writing previously root addresses, which are constructed by aligning in passing order addresses of the relay units existing at branch points in communication routes, into an addressing area of a data area of communication data serving as a transmission object if one-to-one communication between node terminals is to be executed; otherwise, writing previously broadcast group addresses of node terminal groups as broadcast destinations in place of the root addresses into the addressing area of the data area of communication data serving as the transmission object if one-to-plural broadcast communication between node terminals is to be executed; comparing the root addresses or the broadcast group addresses included in the communication data which circulate through one network out of a pair of networks with the root addresses or the broadcast group addresses included in the communication data which circulate through other network out of the pair of networks, by the relay unit which connects the pair of networks; and abandoning the communication data which circulate through at least one network of the pair of networks when, as the result of the above comparing step, it is decided that the root addresses or the broadcast group addresses included in the communication data which circulate through respective networks coincide with each other.

According to the present invention, the relay unit which connects a pair of networks can compare the root addresses or the broadcast group addresses included in the communication data which circulate through one network out of a pair of networks with the root addresses or the broadcast group addresses included in the communication data which circulate through other network out of the pair of networks, and then abandon the communication data which circulate through at least one network of the pair of networks when it is decided as the result of the above comparison that the root addresses or the broadcast group addresses included in the communication data which circulate through respective networks coincide with each other. As a result, duplicate transmission of the communication data can be prevented in broadcast communication.

In order to achieve the above object of the present invention, according to yet still another aspect of the present invention, there is provided a data communication system for executing data exchange between a plurality of networks which are connected via relay units mutually and to which node terminals are connected respectively, each of the relay units comprising: decoding means for decoding root addresses which are constructed by aligning in passing order addresses of the relay units existing at branch points in communication routes, or broadcast group addresses of node terminal groups as broadcast destinations, the root addresses and the broadcast group addresses being written previously into an addressing area of a data area of communication data transmitted from the node terminals; address storing means for storing own address; group address storing means for storing addresses peculiar to the node terminals belonging to node terminal groups corresponding to the broadcast group addresses respectively; broadcast deciding means for deciding whether or not the communication data are transmitted via either one-to-one communication between node terminals or one-to-plural broadcast communication between node terminals, based on the root addresses or the broadcast group addresses decoded by the decoding means; route selecting means for comparing/deciding whether or not own address stored in the address storing means is included in the root addresses decoded by the decoding means, then selecting appropriate routes as the destination of the communication data based on a result of comparison/decision, and then transmitting the communication data to the node terminal designated as the destination via the selected routes, when it is decided as a decision result by the broadcast deciding means that one-to-one communication between node terminals is executed; and otherwise, route selecting means for selecting appropriate routes designated as the destination of the communication data, based on the broadcast group addresses decoded by the decoding means and the addresses peculiar to the node terminals belonging to node terminal groups corresponding to the broadcast group addresses stored in the group address storing means, and then broadcasting the communication data to a plurality of node terminals designated as the broadcast destinations via the selected routes, when it is decided as the decision result by the broadcast deciding means that one-to-plural broadcast communication between node terminals is executed.

According to the present invention, first the decoding means can decode the root addresses which are constructed by aligning in passing order addresses of the relay units existing at branch points in communication routes, or the broadcast group addresses of node terminal groups as broadcast destinations, which are written previously into an addressing area of a data area of communication data transmitted from the node terminals. Then, the broadcast deciding means can decide whether or not the communication data are transmitted via either one-to-one communication between node terminals or one-to-plural broadcast communication between node terminals, based on the root addresses or the broadcast group addresses decoded by the decoding means. Then, the route selecting means can compare/decide whether or not own address stored in the address storing means is included in the root addresses decoded by the decoding means, then selecting appropriate routes as the destination of the communication data based on a result of comparison/decision, and then transmit the communication data to the node terminal designated as the destination via the selected routes when it is decided as a decision result by the broadcast deciding means that one-to-one communication between node terminals is executed. Otherwise, the route selecting means can select appropriate routes designated as the destination of the communication data, based on the broadcast group addresses decoded by the decoding means and the addresses peculiar to the node terminals belonging to node terminal groups corresponding to the broadcast group addresses stored in the group address storing means, and then broadcast the communication data to a plurality of node terminals designated as the broadcast destinations via the selected routes, when it is decided as the decision result by the broadcast deciding means that one-to-plural broadcast communication between node terminals is executed. Therefore, since the root addresses are employed in the case of one-to-one communication between node terminals, or else the broadcast group addresses in place of the root addresses are employed in the case of one-to-plural broadcast communication between the node terminals, even if data exchange is executed between a plurality of networks with the intervention of one or more than two networks in communication routes and also data communication routes branch out into plural routes with the travel of communication data, communication data can be transmitted surely to one or more than two designated node terminals as the destinations without a reduction in data transmission capacity per unit time.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a view showing a format of header information of packet data used when broadcast communication is executed.

DESCRIPTION OF THE PREFERRED EMBODIMENTS

A data communication method and a data communication system using this method according to embodiments of the present invention will be explained in detail with reference to the accompanying drawings hereinafter.

Figure 1:
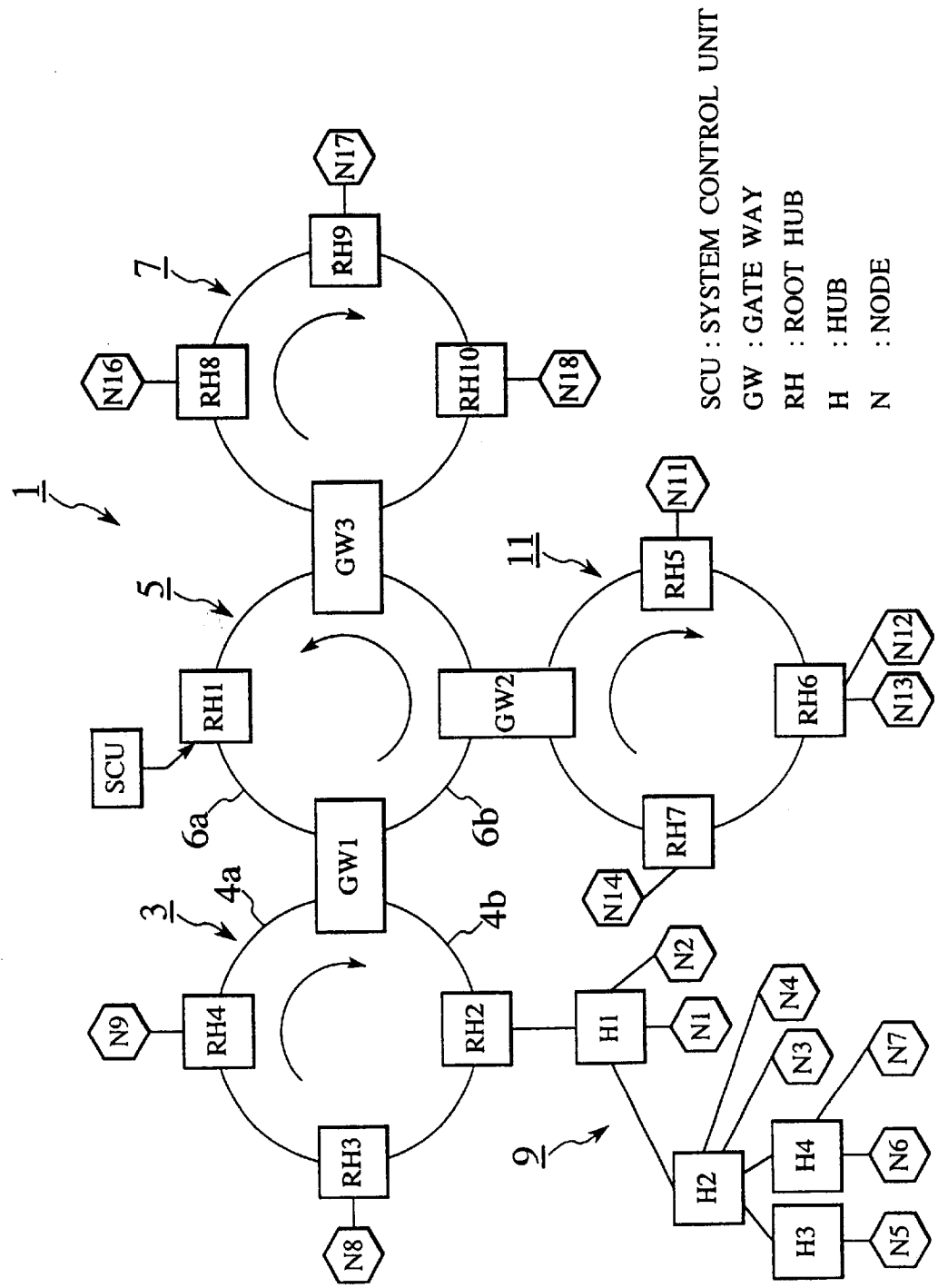
FIG. 1 is a schematic block circuit diagram showing a configuration of a data communication system according to the present invention.

First, as shown in FIG. 1, a data communication system 1 of the present invention is constructed by connecting first to fourth LAN's 3, 5, 7, 11, each being formed by connecting plural root hubs RH by means of loop data transmission lines mutually, via first to third gate ways GW1, GW2, GW3 mutually data-interchangeably and also connecting a multi-layered tree 9 including a plurality of hubs H to a root hub RH2 which belongs to the first LAN 3. As a network topology for the first to fourth LAN's 3, 5, 7, 11, bus type, star type, etc., for example, may be employed appropriately other than the above loop type.

One or more than two node terminals N are connected to a plurality of root hubs RH except for root hubs RH1, RH2 or a plurality of hubs H respectively. If the data communication system according to the present invention is applied to the vehicle communication system, for example, which enables to exchange various data such as digital audio data mutually, appropriate devices such as a vehicle-equipped personal computer, a portable telephone, a DVD-ROM drive, a digital TV, a CD-ROM drive, a navigation system, a radio receiver, a speaker, etc. may be employed as the node terminals N.

In addition, as shown in FIG. 1, individual inherent addresses such as RH1, RH2, RH3, . . . , for example, are allocated previously to the root hubs RH, the hubs H, and the node terminals N respectively. The addresses which are allocated to the node terminals N out of these addresses are used to designate the node terminals N serving as the source or destination, whereas the addresses which are allocated to the root hubs RH or the hubs H are used to designate routes of the communication data in root addresses. Such root addresses are constructed by arranging addresses of relay units positioned at branch points in the communication routes in their passing order. The relay units include the gate ways GW, the root hubs RH, and the rubs H.

In case one-to-one communication is executed between the node terminals, the root addresses which are constructed by arranging addresses of relay units positioned at branch points in the communication routes in their passing order, as described above, are written into the root address writing area. Conversely, in case one-to-plural broadcast communication is executed between the node terminals, broadcast group addresses of the node terminal groups as broadcast destinations are written into the root address writing area. As a result, in the case of one-to-one communication between the node terminals, communication data transmitted from a certain node terminal can be received by the node terminal as the destination via communication routes designated by the root addresses. Conversely, in the case of one-to-plural communication between the node terminals, the communication data transmitted from a certain node terminal can be received by the node terminals as the broadcast destinations which belong to the node terminal group designated by the broadcast group addresses.

The first to third gate ways GW1, GW2, GW3 have a protocol conversion function and a route selection function respectively. According to such protocol conversion function, a protocol conversion can be executed to accommodate packet data to protocols of neighboring LAN's, and then the converted packet data can be sent out to the neighboring LAN's. Such packet data are sent out from either the node terminals N belonging to the first to fourth LAN's 3, 5, 7, 11 respectively or the node terminals N belonging to the multi-layered tree 9. According to such route selection function, a source address assigned to the source node terminal and a destination address assigned to the destination node terminal (referred to as "source/destination addresses" hereinafter), command data and the root addresses, or the broadcast group addresses, which are allocated to the packet data sent out from either of the node terminals N, can be decoded, then appropriate routes as the destination of the packet data can be selected based on the decoded root address, etc., and then the packet data can be sent out to the selected routes.

As shown in FIG. 1, the individual inherent addresses like GW1, GW2, GW3, for example, are allocated in advance to the first to third gate ways GW1, GW2, GW3 respectively. Like the addresses allocated to the root hubs RH or the hubs H, these addresses are used to designate the routes of the communication data in the root addresses.

Figure 2:
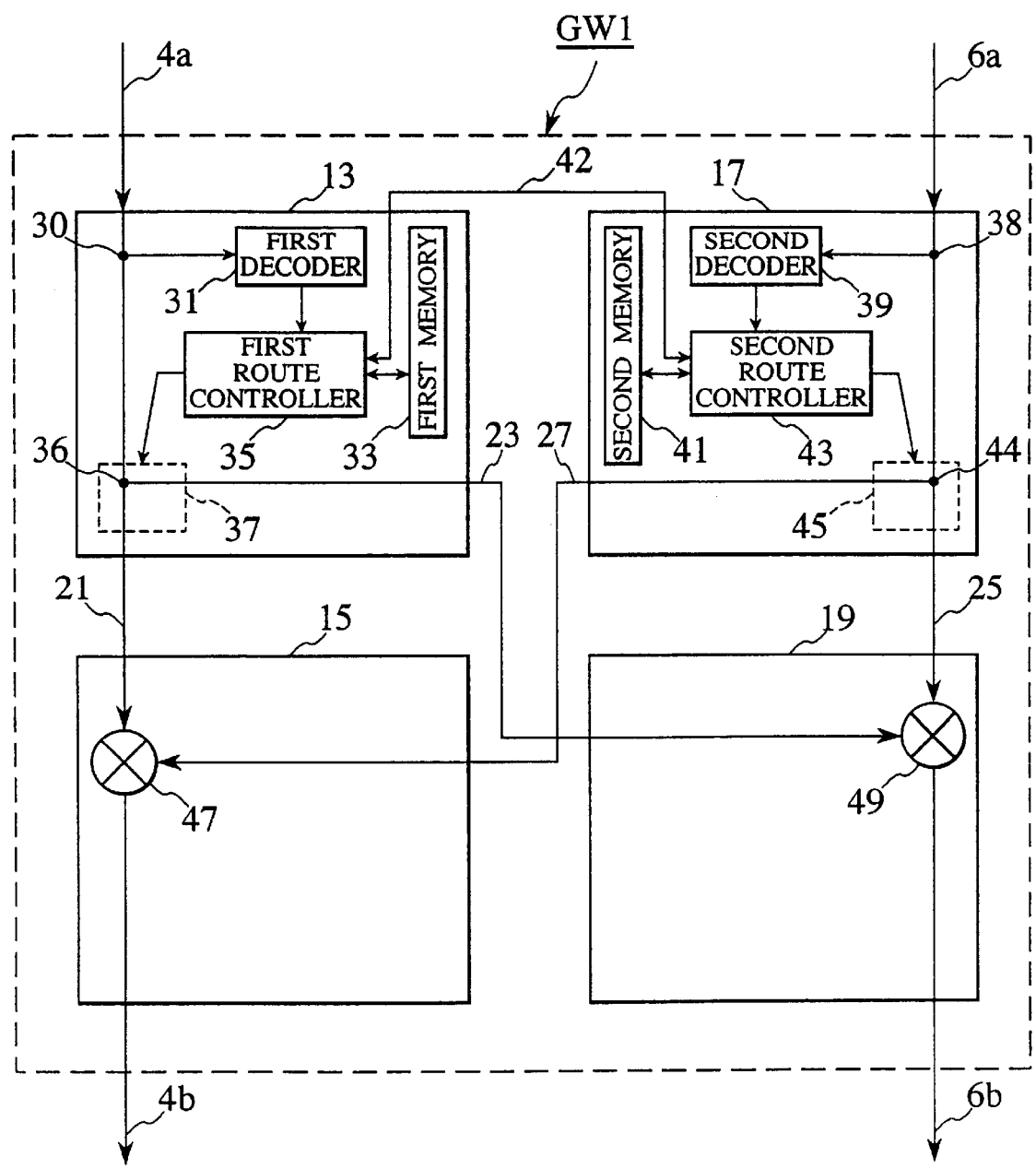
FIG. 2 is a block circuit diagram showing a configuration of a gate way shown in FIG. 1.

In more detail, as shown in FIG. 2, for example, the first gate way GW1 comprises a first distributor 13 and a second distributor 17, and a first mixer 15 and a second mixer 19. More specifically, each of the first distributor 13 and the second distributor 17 can always monitor the presence of the packet data which are passing through the first gate way GW1, then decode respectively the source/destination addresses, the command data and the root addresses or the broadcast group addresses, which are allocated to the packet data, when passing of the packet data can be detected, then select the appropriate route as the destination of the packet data based on the decoded root addresses, etc., and then switch the data transfer destination to the selected route. The first mixer 15 and the second mixer 19 can send out the packet data to the data transfer destinations which are switched by the first distributor 13 and the second distributor 17 respectively.

In addition, the first distributor 13 comprises a first decoder 31, a first memory 33, a first route controller 35, and a first route switcher 37. Similarly, the second distributor 17 comprises a second decoder 39, a second memory 41, a second route controller 43, and a second route switcher 45. More particularly, the first decoder 31 and the second decoder 39 are connected to a first branch point 30 and a second branch point 38 to branch off from input side data transfer lines 4a, 6a respectively. Also, the first decoder 31 and the second decoder 39 can always monitor the presence of the packet data which are passing through the first gate way GW1, and then decode the source/destination addresses, the command data and the root addresses or the broadcast group addresses, which are allocated to the packet data, when the passing of the packet data can be detected respectively. Then, the first memory 33 and the second memory 41 can store the address GW1 of the first gate way respectively and also store the source/destination addresses, the command data and the root addresses or the broadcast group addresses, which are decoded by the first decoder 31 and the second decoder 39. Then, the first route controller 35 and the second route controller 43 can decide whether or not the address of the first gate way GW1 is included in the root addresses decoded by the first decoder 31 and the second decoder 39 respectively, and then select the appropriate routes as the destination of the packet data based on this decision result respectively. Then, the first route switcher 37 and the second route switcher 45 can switch the data transfer destination to the selected routes out of a pair of routes 21, 23 or a pair of routes 25, 27 which are connected to a third branch point 36 and a fourth branch point 44 respectively. The first route controller 35 belonging to the first distributor 13 and the second route controller 43 belonging to the second distributor 17 are connected to each other via a communication line 42 such that stored contents of the first memory 33 and the second memory 41 can be referred to mutually via the communication line 42. In other words, when passing of the packet data can be detected, the first route controller 35 and the second route controller 43 can compare the source/destination addresses, the command data and the root addresses or the broadcast group addresses, which are allocated to the packet data, with the stored contents of the first memory 33 and the second memory 41, then execute a coincidence decision concerning whether or not both addresses and data completely coincide with each other, and then abandon the packet data being passing currently if both addresses and data completely coincide with each other as the result of this coincidence decision.

Further, the first mixer 15 and the second mixer 19 comprise a first multiplexer 47 and a second multiplexer 49 respectively. The first multiplexer 47 and the second multiplexer 49 can packet-multiplex the packet data of the mutual neighboring LAN's when the packet data are sent out to the selected route, and then send out the multiplexed packet data to output side data transfer lines 4b, 6b respectively.

An internal configuration of the gate way GW has been explained while taking the gate way GW1 as an example. Similarly, the internal configurations of the gate ways GW2, GW3 are identical to that of the gate way GW1 and therefore their description will be omitted herein.

Figure 3:
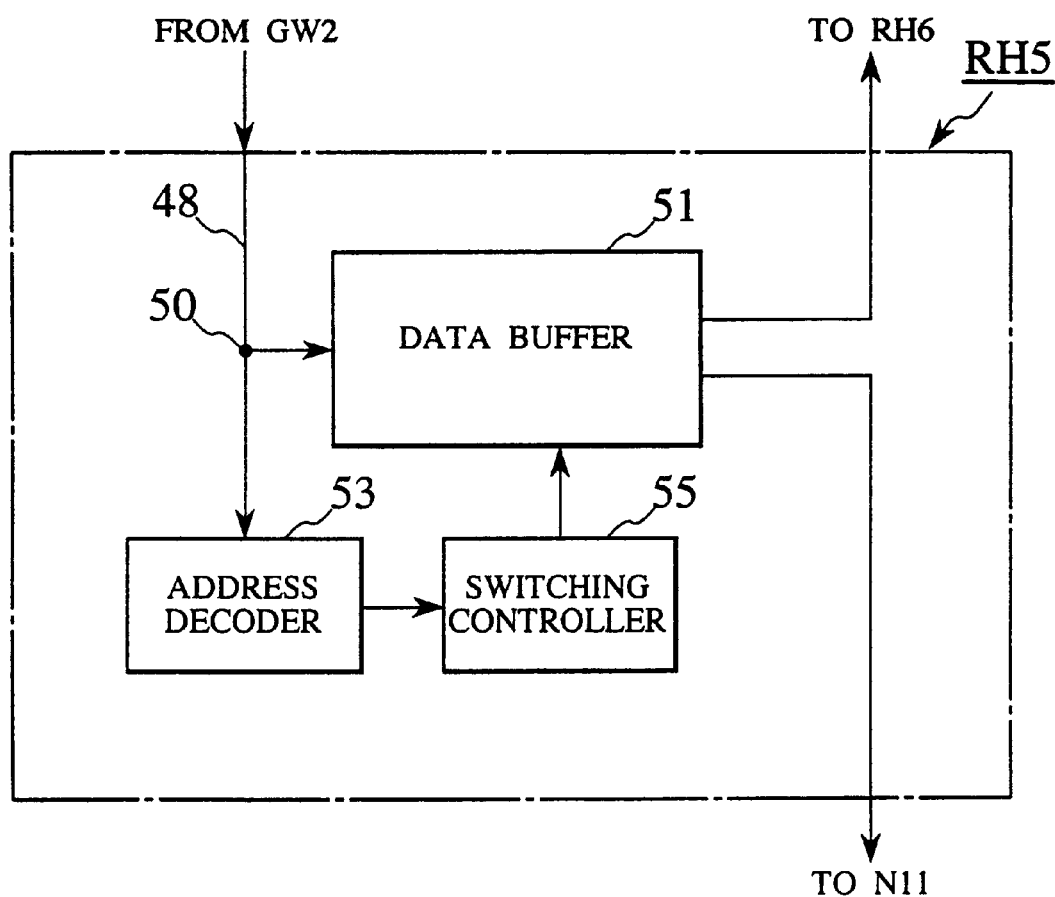
FIG. 3 is a block circuit diagram showing a configuration of a root hub shown in FIG. 1.

In turn, an internal configuration of the root hub RH or the hub H will be explained hereunder to take the root hub RH5 as an example, for example. As shown in FIG. 3, the root hub RH5 comprises a data buffer 51, an address decoder 53, and a switching controller 55. More particularly, the data buffer 51 is connected to a fifth branch point 50 to branch off from an RH data transfer line 48 which is extended from the second gate way GW2 positioned adjacently on the upstream side along the data transfer direction. Also, the data buffer 51 can always monitor the presence of the packet data which are passing through the root hub RH5, and then store temporarily the packet data passing currently when the passing of the packet data can be detected. Then, the address decoder 53 can decode the source/destination addresses, the command data and the root addresses or the broadcast group addresses, which are allocated to the packet data passing currently. Then, the switching controller 55 can decide based on the root addresses, etc. decoded by the address decoder 53 whether or not the packet data which are passing at this time are transmitted by broadcast communication, then decide whether or not the address of the root hub RH5 is included in the root addresses unless the packet data are transmitted by broadcast communication, and then select appropriate routes as the destination of the packet data stored in the data buffer 51 based on these decision results.

Respective internal configurations of the root hubs RH or the hubs H have been explained while taking the root hub RH5 as an example. Similarly, since the internal configurations of the root hubs RH or the hubs H other than the root hub RH5 are the same as that of the root hub RH, their description will be omitted herein.

An internal configuration of the switching controller 55 will be explained in more detail with reference to FIG. 4 hereunder.

Figure 4:
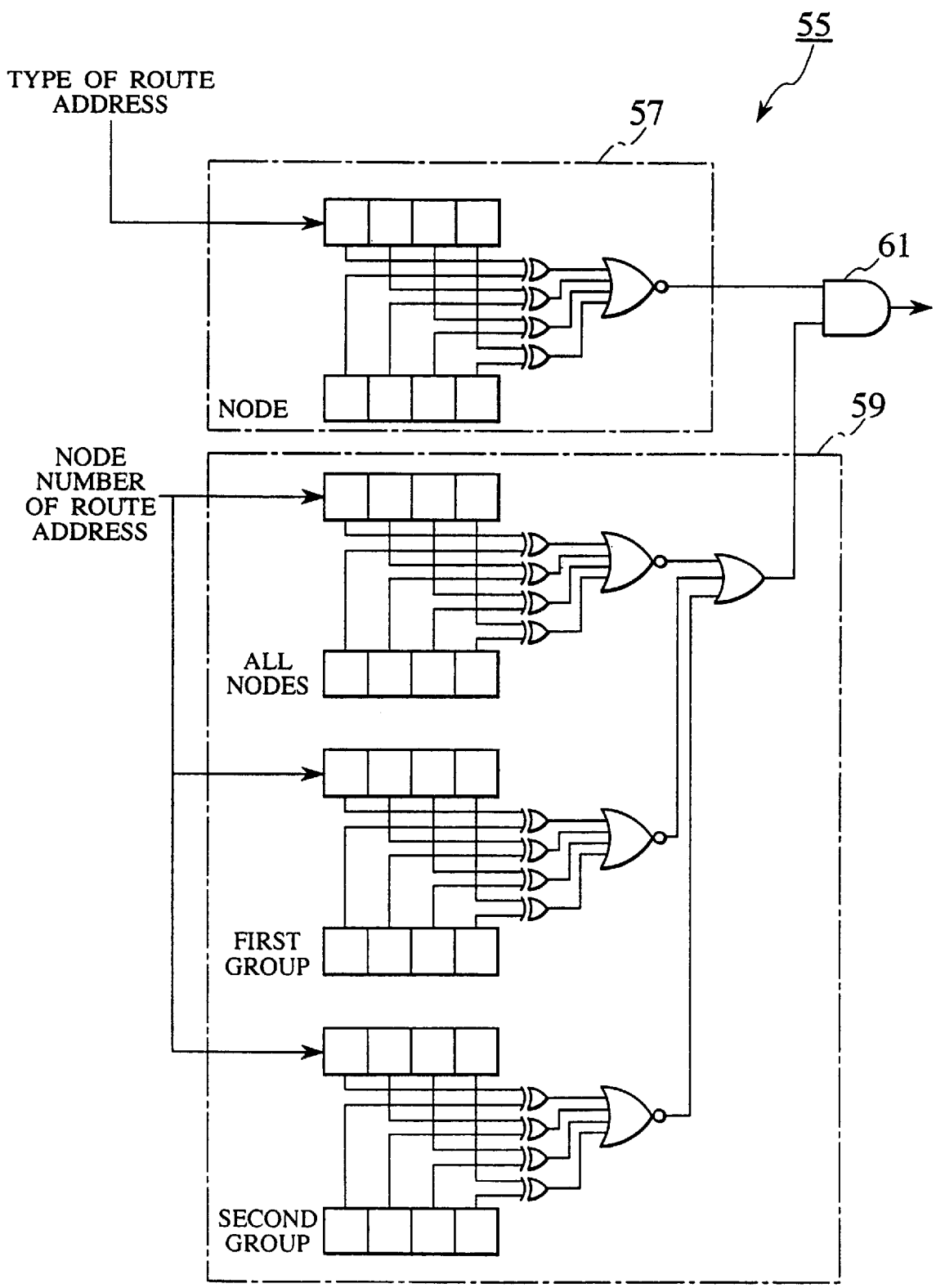
FIG. 4 is a block circuit diagram showing a configuration of a switching controller in the route hub shown in FIG. 3.

As shown in FIG. 4, the switching controller 55 comprises a broadcast decision portion 57, a broadcast group decision portion 59, a logical product (AND) circuit 61, and a route controller (not shown). The broadcast decision portion 57 can decide whether or not the node terminals N constituting a part of the broadcast group addresses in place of the relay units are written into the root address writing area. Then, the broadcast group decision portion 59 can decide whether or not a broadcast group symbol (X, Y, or Z) shown in FIG. 6 and constituting a part of the broadcast group addresses in place of the number of the relay units is written into the root address writing area. Then, the logical product circuit 61 can send out a signal to the effect that the broadcast communication has been carried out when the broadcast decision portion 57 has decided that the node terminal N is written into a type column of the relay unit and the broadcast group decision portion 59 has decided that the broadcast group symbol is written into a number column of the relay unit. On the contrary, the logical product circuit 61 can send out a signal to the effect that the broadcast communication has not been carried out when the broadcast decision portion 57 has decided that the node terminal N is not written into the type column of the relay unit or the broadcast group decision portion 59 has decided that the broadcast group symbol is not written into the number column of the relay unit. In response to the signal from the logical product circuit 61 indicating that the broadcast communication has been carried out or not, the route controller can select appropriate routes as the destination of the packet data stored in the data buffer 51. The broadcast group addresses are constructed so as to include the node terminal N to be written in the type column of the relay unit and the broadcast group symbol to be written in the number column of the relay unit. In addition, illustrative circuits using memories and various binary (two-valued) logic cells in combination have been shown as the circuit configurations of the broadcast decision portion 57, the broadcast group decision portion 59, and the logical product circuit 61. But the present invention is not limited to such illustrative circuits, and any type of circuits may be employed if their equivalent functions can be accomplished.

Subsequently, while taking the node terminal N5 belonging to the multi-layered tree 9 as the source, an operation of the data communication system constructed as above according to the present invention will be explained hereunder.

Figure 5:
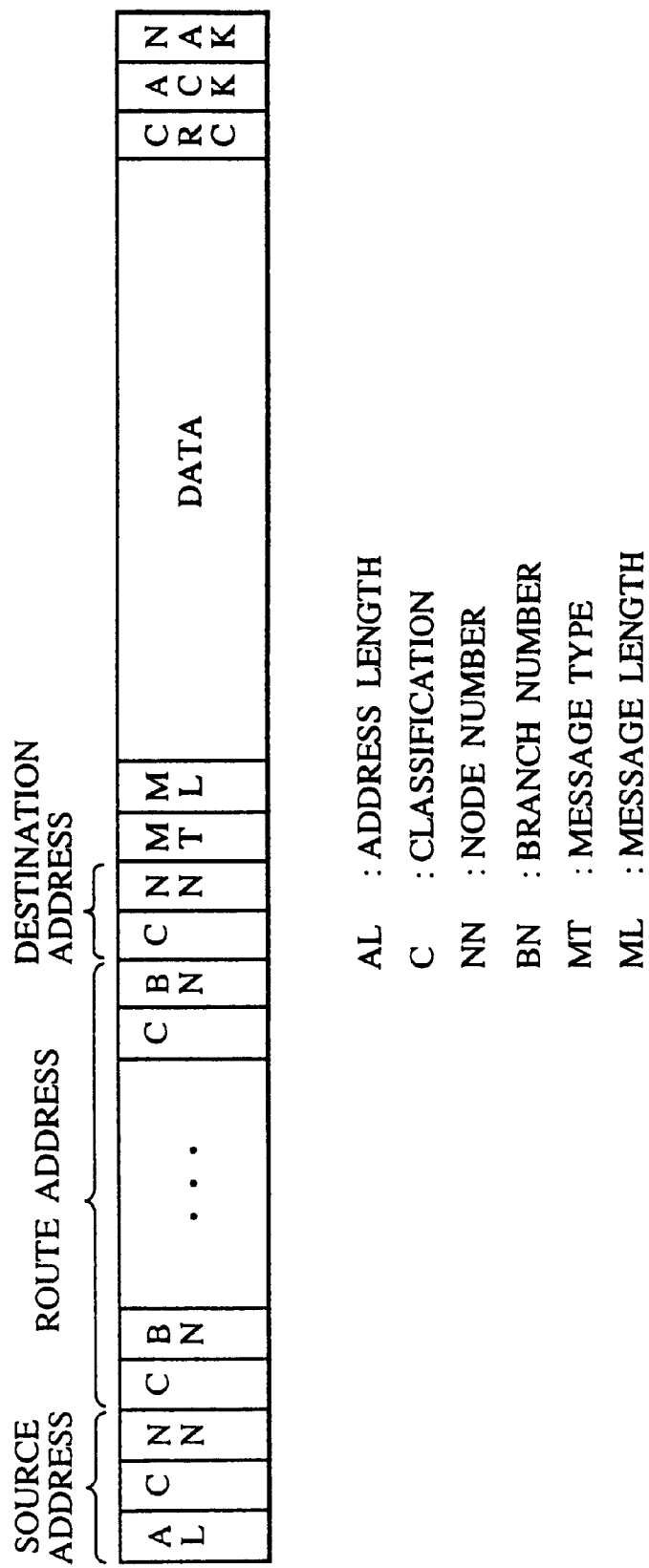
FIG. 5 is a view showing a format of header information of packet data used when one-to-one communication is executed between node terminals.

First of all, if the packet data as the transmission object transmitted from the node terminal N5 as the source are composed of the data which are transmitted via one-to-one communication between the node terminals, the address generator (not shown) built in the hub H3 can generate the source/destination addresses, then read the root address which corresponds to the destination of the packet data from the route information stored in the route memory (not shown), and then generate the root address corresponding to the destination of the packet data. Then, the address allocator (not shown) can allocate the source/destination addresses and the root address generated by the address generator (not shown) to the packet data as header information, and then send out the packet data onto the data transfer line. Header information allocated to the packet data can be arranged according to a format shown in FIG. 5, for example. In other words, addresses of the relay units including the hubs H, the root hubs RH, and the gate ways GW, which exist at the branch points of the communication routes of the packet data transmitted from the source, are set in a root address writing area such that they are aligned in due order from the source to the destination.

In contrast, if the packet data as the transmission object transmitted from the node terminal N5 as the source are composed of data which are transmitted via one-to-plural broadcast communication between the node terminals, the address generator (not shown) can generate the address of the source, then read broadcast group address of the node terminal groups serving as the broadcast destinations of the packet data from the broadcast group address information stored in the broadcast group address memory (not shown), and then generate the broadcast group address corresponding to the broadcast destination of the concerned packet data. Then, the address allocator (not shown) can allocate the address of the source and the broadcast group address generated by the address generator to the packet data as the header information, and then send out the packet data onto the data transfer line. Header information allocated to the packet data can be arranged according to a format shown in FIG. 6, for example. In other words, if the packet data are transmitted via one-to-plural broadcast communication between the node terminals, the node terminal N is described in the type column of the relay unit of the root address writing area and the broadcast group symbol (X, Y, or Z) is described in the number column of the relay unit. An example of the broadcast group symbol is shown in FIG. 6. Referring to FIG. 6, for example, respective broadcast group symbols are set in advance such that X is the broadcast group symbol designating all nodes, Y is the broadcast group symbol designating nodes belonging to the first group being organized previously, and Z is the broadcast group symbol designating nodes belonging to the second group being organized previously. One of these broadcast group symbols is described in the number column of the relay unit. Although a situation where three type of broadcast destinations are set as the broadcast groups has been illustrated in the present embodiment, the present invention is not limited to this embodiment. In accordance with the number of node terminals to be connected to a composite network which is constructed by connecting a plurality of networks mutually, types of the broadcast group may be set arbitrarily.

Next, operational procedures of the first gate way GW1 which exists in the communication route of the packet data transmitted from the node terminal N5 as the source will be explained with reference to FIG. 2.

At first, the first decoder 31 of the first gate way GW1 can always monitor whether or not the packet data which are passing through the first gate way GW1 exists. Then, if passing of the packet data exists, a process of decoding the source/destination addresses, the command data, and the root addresses or the broadcast group addresses allocated to the packet data is carried out.

In response to the source/destination addresses, the command data, and the root addresses or the broadcast group addresses decoded as above, the first route controller 35 can store in the first memory 33 the root addresses, etc. which are allocated to the packet data passing currently, then compare the source/destination addresses, the command data, and the root addresses or the broadcast group addresses with the stored contents of the neighboring second memories 41 by referring to the stored contents of the second memory 41 via the communication line 42, and then execute a coincidence decision as for whether or not mutual addresses and data completely coincide with each other. As the result of this coincidence decision, if mutual addresses and data completely coincide with each other, i.e., if the neighboring LAN's have received the packet data which are passing at this time, the packet data passing currently are abandoned. In contrast, if the broadcast group addresses are described in place of the root addresses in an addressing area of the communication data, i.e., if the packet data which reach the first gate way GW1 are the object of the broadcast communication, the first gate way GW1 can unconditionally transfer the packet data to both the own LAN and the neighboring other LAN's. However, once the packet data are circulated in the LAN, respective relay units being connected to the LAN can catch such circulated packet data at need. Therefore, if circulation of the packet data after being circulated once is repeated still yet, the packet data are duplicatedly transmitted. For this reason, if the neighboring LAN's have already received the packet data being passing currently, duplicate transmission of the packet data during the broadcast communication can be prevented by abandoning the packet data being passing at this time.

On the other hand, as the result of the above coincidence decision, unless mutual addresses and data completely coincide with each other, i.e., unless the neighboring LAN's have received yet the packet data which are passing at this time, the first route controller 35 can compare and decide whether or not the address GW1 of the first gate way stored in the first memory 33 are included in the root addresses decoded by the first decoder 31, and then select appropriate routes as the destination of the packet data based on this comparison/decision result.

More specifically, as the result of above comparison/decision result, unless the address of the first gate way GW1 is included in the root addresses, the first route controller 35 can select the route 21 of own LAN as the destination of the packet data. Following to this selection, the first route switcher 37 can switch the data transfer destination to the route 21 of selected own LAN, and then send out the packet data to the output side data transfer line 4b via the first multiplexer 47. As a consequence, the packet data can circulate around the first LAN 3.

In contrast, as the result of above comparison/decision result, if the address of the first gate way GW1 is included in the root addresses, the first route controller 35 can select the route 23 of other LAN as the destination of the packet data. Following to this selection, the first route switcher 37 can switch the data transfer destination to the selected route 23 of other LAN, and then send out the packet data to the second multiplexer 49. The second multiplexer 49 can then packet-multiplex the packet data of the second LAN 5 to which the second multiplexer 49 belongs and the packet data of the first LAN 3, and then send out the multiplexed packet data to the output side data transfer line 6b. Consequently, the packet data can be transferred from the first LAN 3 to the second LAN 5.

In addition, while taking as examples a case where the node terminal N11 is designated as the destination of the packet data transmitted from the node terminal N5 and a case where broadcast groups including the node terminal N11 are designated, an operation of the root hub RH5 to which the node terminal N11 is connected will be explained hereinbelow.

At first, the data buffer 51 in the root hub RH5 can always monitor the presence of the packet data which is passing through the root hub RH5, and then execute process of storing the packet data being passing through at this time when the passing of the packet data can be detected. Then, the address decoder 53 can decode the source/destination addresses and the root addresses, which are allocated to the packet data passing at this time. In response to the source/destination addresses and the root addresses decoded by the address decoder 53, the broadcast decision portion 57 can decide whether or not the node terminal N in place of the type of the relay unit is described in the root address describing area. Also, the broadcast group decision portion 59 can decide whether or not the broadcast group symbol in place of the number of the relay unit is described in the root address describing area. As the result of these decision, if the broadcast decision portion 57 has decided that the node terminal N which is never described upon designating the communication route, except the relay units, is described in the type column of the relay unit and also the broadcast group decision portion 59 has decided that the broadcast group symbol is described in the number column of the relay unit, i.e., if the one-to-plural broadcast communication between the node terminals has been executed, the switching controller 55 can select both the route for the node terminal N and the route for the root hub RH6 as the destination of the packet data stored in the data buffer 51. As a result, the node terminal designated as the broadcast destination can receive the packet data.

On the contrary, as the result of these decision, if the broadcast decision portion 57 has decided that the node terminal N is not described in the type column of the relay unit or the broadcast group decision portion 59 has decided that the broadcast group symbol is not described in the number column of the relay unit, i.e., if the one-to-one communication between the node terminals has been executed, the RH route controller (not shown) can decide, based on the root addresses decoded by the address decoder 53, whether or not the address of the root hub RH5 is included in the root addresses. Based on this decision result, the RH route controller can then select the appropriate route as the destination of the packet data.

In other words, unless the address of the root hub RH5 is included in the root addresses, the route which enables the packet data to supply to the root hub RH6 is selected. On the contrary, if the address of the root hub RH5 is included in the root addresses, the route for designating a succeeding address which is positioned next to the address of the root hub RH5 aligned in the root addresses is selected as the communication destination. In the case of the relay unit where the root hub RH5 acts as a terminal unit, the succeeding address does not exist in the root addresses. In this event, the route which is connected to the node terminal N11 as the destination designated by the destination address can be selected. Accordingly, the packet data transmitted from the node terminal N5 can be received by the node terminal N11.

In this fashion, in the case of one-to-one communication between the node terminals, the root addresses may be employed and, in the case of one-to-plural broadcast communication between the node terminals, the broadcast group addresses in place of the root addresses may be employed. As a result, even when data exchange is executed between plural networks with the intervention of one or more than two networks in communication routes and also data communication routes branch out into plural routes with the travel of communication data, the communication data can be transmitted firmly to the designated destination node terminal without the reduction in data transmission capacity per unit time.

It should be understood that many modifications and adaptations of the invention will become apparent to those skilled in the art and it is intended to encompass such obvious modifications and changes in the scope of the claims appended hereto.

What is claimed is:

1. A data communication method used to execute data exchange between a plurality of networks which are connected via relay units mutually and to which node terminals are connected respectively, comprising the steps of:

writing previously root addresses, which are constructed by aligning in passing order addresses of the relay units existing at branch points in communication routes, into an addressing area of a data area of communication data serving as a transmission object if one-to-one communication between node terminals is to be executed;

otherwise, writing previously broadcast group addresses of node terminal groups as broadcast destinations in place of the root addresses into the addressing area of the data area of communication data serving as the transmission object if one-to-plural broadcast communication between node terminals is to be executed;

decoding the root addresses or the broadcast group addresses included in the communication data transmitted from the node terminals by the relay units;

deciding that the communication data are transmitted via either one-to-one communication between node terminals or one-to-plural broadcast communication between node terminals, by the relay units based on the decoded root addresses or the decoded broadcast group addresses;

when, as a result of the above deciding step, it is decided that one-to-one communication between node terminals is executed, comparing/deciding by the relay units whether or not previously stored addresses of the relay units are included in the decoded root addresses, then selecting appropriate routes as a destination of the communication data by the relay units based on a result of comparison/decision, and then transmitting the communication data to node terminals designated as the destination via the selected routes; and when, as the result of the above deciding step, it is decided that one-to-plural broadcast communication between the node terminals is executed, selecting appropriate routes as the destination of the communication data by the relay units based on the decoded broadcast group addresses and addresses peculiar to the node terminals belonging to node terminal groups corresponding to the broadcast group addresses stored previously, and then broadcasting the communication data to a plurality of node terminals designated as the broadcast destinations via the selected routes by the relay units.

2. A data communication method according to claim 1, wherein the relay units includes the relay units to which the node terminals are connected and the relay units to which the node terminals are not connected.

3. A data communication method used to execute data exchange between a plurality of networks which are connected via relay units mutually and to which node terminals are connected respectively, comprising the steps of:

writing previously root addresses, which are constructed by aligning in passing order addresses of the relay units existing at branch points in communication routes, into an addressing area of a data area of communication data serving as a transmission object if one-to-one communication between node terminals is to be executed;

otherwise, writing previously broadcast group addresses of node terminal groups as broadcast destinations in place of the root addresses into the addressing area of the data area of communication data serving as the transmission object if one-to-plural broadcast communication between node terminals is to be executed;

decoding the root addresses or the broadcast group addresses included in the communication data transmitted from other node terminals connected to other relay units except own node terminal, by the relay units to which the node terminals are connected;

deciding that the communication data are transmitted via either one-to-one communication between node terminals or one-to-plural broadcast communication between node terminals, by the relay units to which the node terminals are connected, based on the decoded root addresses or the decoded broadcast group addresses;

when, as a result of the above deciding step, it is decided that one-to-plural broadcast communication between node terminals is executed, deciding whether or not the node terminal connected to own network as a destination of the communication data is designated, by the relay units to which the node terminals are connected, based on the decoded broadcast group addresses and addresses peculiar to the node terminals belonging to node terminal groups corresponding to the broadcast group addresses stored previously; and when, as the result of the above deciding step, it is decided that the node terminal connected to own network as the destination of the communication data is designated, selecting both routes for the node terminals connected to own network and routes for the relay units connected to own network, by the relay units to which the node terminals are connected, based on the decoded broadcast group addresses, and then broadcasting the communication data to a plurality of node terminals designated as the broadcast destinations via the selected routes respectively by the relay units to which the node terminals are connected.

4. A data communication method used to execute data exchange between a plurality of networks which are connected via relay units mutually and to which node terminals are connected respectively, comprising the steps of:

writing previously root addresses, which are constructed by aligning in passing order addresses of the relay units existing at branch points in communication routes, into an addressing area of a data area of communication data serving as a transmission object if one-to-one communication between node terminals is to be executed;

otherwise, writing previously broadcast group addresses of node terminal groups as broadcast destinations in place of the root addresses into the addressing area of the data area of communication data serving as the transmission object if one-to-plural broadcast communication between node terminals is to be executed;

comparing the root addresses or the broadcast group addresses included in the communication data which circulate through one network out of a pair of networks with the root addresses or the broadcast group addresses included in the communication data which circulate through other network out of the pair of networks, by the relay unit which connects the pair of networks; and abandoning the communication data which circulate through at least one network of the pair of networks when, as the result of the above comparing step, it is decided that the root addresses or the broadcast group addresses included in the communication data which circulate through respective networks coincide with each other.

5. A data communication system for executing data exchange between a plurality of networks which are connected via relay units mutually and to which node terminals are connected respectively, each of the relay units comprising:

decoding means for decoding root addresses which are constructed by aligning in passing order addresses of the relay units existing at branch points in communication routes, or broadcast group addresses of node terminal groups as broadcast destinations, the root addresses and the broadcast group addresses being written previously into an addressing area of a data area of communication data transmitted from the node terminals;

address storing means for storing own address;

group address storing means for storing addresses peculiar to the node terminals belonging to node terminal groups corresponding to the broadcast group addresses respectively;

broadcast deciding means for deciding whether or not the communication data are transmitted via either one-to-one communication between node terminals or one-to-plural broadcast communication between node terminals, based on the root addresses or the broadcast group addresses decoded by the decoding means;

route selecting means for comparing/deciding whether or not own address stored in the address storing means is included in the root addresses decoded by the decoding means, then selecting appropriate routes as the destination of the communication data based on a result of comparison/decision, and then transmitting the communication data to the node terminal designated as the destination via the selected routes, when it is decided as a decision result by the broadcast deciding means that one-to-one communication between node terminals is executed; and otherwise, route selecting means for selecting appropriate routes designated as the destination of the communication data, based on the broadcast group addresses decoded by the decoding means and the addresses peculiar to the node terminals belonging to node terminal groups corresponding to the broadcast group addresses stored in the group address storing means, and then broadcasting the communication data to a plurality of node terminals designated as the broadcast destinations via the selected routes, when it is decided as the decision result by the broadcast deciding means that one-to-plural broadcast communication between node terminals is executed.

* * * * *